(12) United States Patent
Sato

(10) Patent No.: US 8,919,606 B2
(45) Date of Patent: Dec. 30, 2014

(54) HOLE PLUG

(75) Inventor: Takehiro Sato, Toyota (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 0 days.

(21) Appl. No.: 13/820,235

(22) PCT Filed: Sep. 2, 2011

(86) PCT No.: PCT/JP2011/069993
§ 371 (c)(1),
(2), (4) Date: May 2, 2013

(87) PCT Pub. No.: WO2012/029939
PCT Pub. Date: Mar. 8, 2012

(65) Prior Publication Data
US 2013/0219798 A1 Aug. 29, 2013

(30) Foreign Application Priority Data

Sep. 3, 2010 (JP) .................................. 2010-197419
Jul. 20, 2011 (JP) .................................. 2011-158907

(51) Int. Cl.
| B65D 39/02 | (2006.01) |
| B62D 25/24 | (2006.01) |
| F16J 13/14 | (2006.01) |
| F16B 5/12 | (2006.01) |
| F16B 21/08 | (2006.01) |

(52) U.S. Cl.
CPC .................. *F16J 13/14* (2013.01); *B62D 25/24* (2013.01); *F16B 5/128* (2013.01); *F16B 5/126* (2013.01); *F16B 21/088* (2013.01)
USPC ........... 220/802; 215/363; 220/800; 220/787; 220/790

(58) Field of Classification Search
USPC ......... 220/780, 784, 787, 789, 790, 796, 800, 220/801, 802, 359.1, 359.4, 233; 16/2.3, 16/2.5, 2.1; 215/355, 364, 363
See application file for complete search history.

(56) References Cited

U.S. PATENT DOCUMENTS

| 8,371,789 B2 * | 2/2013 | Takita ........................... 411/508 |
| 2001/0049858 A1 | 12/2001 | Huet |
| 2007/0062962 A1 | 3/2007 | Iwahara |
| 2011/0233950 A1 | 9/2011 | Takita |

FOREIGN PATENT DOCUMENTS

| JP | 2005-315327 A | 11/2005 |
| JP | 2009-293661 A | 12/2009 |
| JP | 2010-090991 A | 4/2010 |

OTHER PUBLICATIONS

Europe Patent Office, "European search report for EP 11821953.4," Jan. 2, 2014.

* cited by examiner

*Primary Examiner* — Mickey Yu
*Assistant Examiner* — Allan Stevens
(74) *Attorney, Agent, or Firm* — Manabu Kanesaka

(57) ABSTRACT

A hole plug has a head portion, a leg portion protruding from the head portion, and a flange portion protruding on an upper circumference of the leg portion. The leg portion includes an inner wall having an approximately cylindrical shape and connected to the head portion; and an outer wall extending along the inner wall with a gap among the inner wall from a folded portion provided in an end portion of the inner wall, and forming a bendable thin-walled portion. The thin-walled portion is elastically bent by an external force to be capable of transitioning from a first usage aspect in which the outer wall is locked in the hole with the thin-walled portion being in a non-bending state to a second usage aspect in which a force larger than the first usage aspect is provided to pressure contact relative to the hole.

8 Claims, 5 Drawing Sheets

HOLE PLUG

FIELD OF TECHNOLOGY

The present invention relates to a hole plug which blocks a hole provided in a plate material such as a vehicle body panel and the like; especially, relates to the hole plug composed of a single member.

BACKGROUND ART

For example, in the vehicle body panel and the like, there is provided a hole (including a window or an opening) in order to carry out an operation or an inspection, or in order to pass a wiring through. Such a hole is blocked by a hole plug in order to prevent water and the like from penetrating in a case where the hole is not used. As for a conventional product, there is known a hole plug of a single member such as being described in, for example, Patent Document 1 and Patent Document 2.

In the Patent Document 1, there is described the hole plug in which the present applicant applied for a patent. Technical characteristics of the hole plug are as follows. In a structure comprising a head portion, a leg portion provided to protrude from the head portion, and a flange portion provided to protrude on an upper circumference of the leg portion, and blocking the hole in a state wherein the leg portion is inserted and locked relative to the hole provided in the plate material until the flange portion hits against a plate material side and is controlled, the leg portion includes a cylindrical inner wall (a first wall); an outer wall (a second wall) covering a circumference of the inner wall; a rib which connects the inner wall and the outer wall; and a locking claw provided on the outer wall, and locked in a peripheral edge thereof when the locking claw is inserted into the hole on the plate material side. Also, the aforementioned rib is disposed corresponding to a position of the locking claw, and in a case wherein the rib is viewed from an inserting direction of the leg portion, the rib is inclined relative to a radial direction of the hole plug so as to provide an excellent moldability while obtaining a high extraction force.

Technical characteristics of the hole plug described in the Patent Document 2 are as follows. In a structure blocking the hole by fitting an annular groove provided on an outer circumference into the peripheral edge of the hole of the plate material, a plug central portion and a plug outer circumferential portion having the annular groove are connected by an elastic-force imparting portion whose cross-sectional surface approximately has a U shape. Between the plug central portion and the plug outer circumferential portion, there includes a holding device which mutually engages by an elastic force of the elastic-force imparting portion in a used state, and holds the plug central portion in a predetermined position so as to improve a waterproof performance and to be capable of being removably used repeatedly.

PRIOR ART DOCUMENTS

Patent Documents

Patent Document 1: Japanese Patent Application Publication No. 2010-90991

Patent Document 2: Japanese Patent Application Publication No. 2004-116709

SUMMARY OF THE INVENTION

Problems to be Solved by the Invention

The structure of the hole plug described in the Patent Document 1 excels in that since locking claws are scattered around the outer wall compared to a structure wherein the locking claws are continuously disposed all around the outer wall, the hole plug in the Patent Document 1 can be easily inserted into the hole. However, meanwhile, it is difficult to enlarge a force necessary for extracting the hole plug from the hole. Namely, a need for enlarging the force necessary for extracting the hole plug from the hole while controlling a necessary force when the hole plug is inserted into the hole, cannot be sufficiently fulfilled. On the other hand, in the structure of the hole plug described in the Patent Document 2, the annular groove is operated to be fitted into the peripheral edge of the hole so as to have a poor operability at an attachment time. Also, in each Patent Document 1 and 2, in the used state, for example, if an external force in a direction releasing an engagement of the holding device is applied to the plug central portion, there is a possibility that the engagement of the holding device might be unanticipatedly disengaged.

The present invention is made with an object of solving the aforementioned problems, and provides a hole plug whose structure is simplified, and which excels in the operability when the hole plug is attached to the hole, and an insertability relative to the hole of the plate material. For example, even if an external force in a direction releasing the engagement with the hole is applied, there is no possibility that the engagement with the hole might be disengaged.

Means for Solving the Problems

In order to obtain the aforementioned object, the present invention provides a hole plug having the characteristic (1) hereinafter described.

(1)

A hole plug comprises a head portion; a leg portion provided to protrude from the head portion; and a flange portion provided to protrude on an upper circumference of the leg portion. Relative to a hole provided in a plate material, the hole plug blocks the hole in a state wherein the leg portion is inserted and locked until the flange portion abuts against the plate material and is controlled. The leg portion includes an approximately cylindrical inner wall connected to the head portion; and an outer wall extending along the inner wall with a gap among the inner wall from a folded portion provided in an end portion of the inner wall, and forming a bendable thin-walled portion in one portion thereof. The thin-walled portion is elastically bent by an external force to be capable of transitioning from a first usage condition in which the outer wall is locked in the hole with the thin-walled portion being in a non-bending state to a second usage condition in which a force larger than the first usage condition is provided to pressure contact relative to the hole.

It is preferable that the hole plug having the characteristic (1) further have the following characteristics (2) to (7).

(2)

In the hole plug having the characteristic (1), the outer wall includes a plurality of locking claws engaging with a peripheral edge of the hole. In the second usage condition, there are formed a first bend portion wherein a vicinity of the folded portion in the thin-walled portion is bent, and a second bend portion wherein a vicinity of the locking claw in the thin-walled portion is bent.

(3)

In the hole plug having the characteristic (2), the folded portion of the inner wall is formed as a rigid-body portion having a thickness in an insertion direction more than the thin-walled portion of the outer wall so as to prevent the locking claw from falling inward in the second usage condition, and to maintain an abutting state of the locking claw relative to the plate material.

(4)

In the hole plug having any of the characteristics (1) to (3), the inner wall in the second usage condition is displaced in a front direction separating from the plate material relative to a position in the first usage condition together with the head portion. Also, the outer wall in the second usage condition has an upper portion displaced inward relative to the position in the first usage condition, and a lower portion displaced outward.

(5)

In the hole plug having any of the characteristics (1) to (4), in the first usage condition wherein the leg portion is locked in the hole, the thin-walled portion of the outer wall is provided between a portion passing through the hole and protruding outward, and the folded portion. Also, the thin-walled portion is formed longer than a total length of the folded portion.

(6)

In the hole plug having any of the characteristics (1) to (5), the flange portion is connected to an end portion of the outer wall, and the head portion in the first usage condition has approximately the same height as a connecting portion between the flange portion and the outer wall.

(7)

The outer wall can automatically return to the first usage condition after transitioning to the second usage condition.

Effect of the Invention

The hole plug according to the present invention has the characteristic (1) so as to be capable of transitioning from the first usage condition, wherein the leg portion is locked in the hole of the plate material in a non-bending state of the thin-walled portion of the outer wall, to the second usage condition, wherein the outer wall is elastically bent through the thin-walled portion and increases a pressed contacting force relative to the hole. Accordingly, the hole plug according to the present invention can provide the following advantages. (A) In the first usage condition, when an external force in a pull-out direction from an inside or a leg portion side acts, in the present invention, easy extraction can be prevented by temporarily transitioning to the second usage condition. In other words, the present invention can transition from the first usage condition having a value at a usual time to the second usage condition having a value higher than that of the first usage condition so as to be capable of improving versatility. (B) Generally, in a conventional product, when an extraction force of the hole plug is enhanced, an insertion force relative to the hole is proportionately enhanced as well, and an attaching operability can easily deteriorate. In this regard, in the hole plug having the characteristic (1), the insertion force when the hole plug is transitioned to the first usage condition, and the external force required when the hole plug is transitioned from the first usage condition to the second usage condition, are independent so as to be capable of maintaining the attaching operability.

The hole plug according to the present invention further has the characteristic (2), so that when the hole plug is transitioned to the second usage condition, the first bend portion and the second bend portion are disposed between the outer wall which is not bent near the locking claw, and the folded portion, and the outer wall which is not bent near the locking claw is pressed and displaced in a direction separating from the folded portion. Accordingly, a high extraction force and a high shear force resistance can be provided.

Also, the hole plug according to the present invention further has the characteristic (3), so that the folded portion of the inner wall becomes the rigid-body portion having the thickness in the insertion direction. Accordingly, in the second usage condition, the folded portion of the inner wall receives the external force applied to the locking claw so as to be capable of reliably preventing the locking claw from falling inward.

Also, the hole plug according to the present invention further has the characteristic (4), so that in the second usage condition, the upper portion of the outer wall of the leg portion is displaced inward. Accordingly, it is easy to provide a high water-tightness through the flange portion. Also, the lower portion of the outer wall is displaced outward, so that a locking force or the extraction force relative to the hole increases.

Also, the hole plug according to the present invention further has the characteristic (5), so that the thin-walled portion is provided between the portion passing through the hole and protruding outward, and the folded portion, in the outer wall. Also, the thin-walled portion is formed thinner than the inner wall, so that, for example, in the first usage condition, when the thin-walled portion receives a force in an extraction direction shown by an arrow, first, the thin-walled portion of the outer wall is bent, and gradually transitions to the second usage condition. Thereby, a stable high extraction force can be reliably obtained.

Also, the hole plug according to the present invention further has the characteristic (6), so that the head portion has approximately the same height as the connecting portion between the flange portion and the outer wall in the first usage condition. Accordingly, an appearance of the hole plug according to the present invention in the first usage condition becomes excellent.

Also, the hole plug according to the present invention further has the characteristic (7), so that, for example, even if a worker presses the head portion from an inside or a back side by mistake so as to transition to the second usage condition, the leg portion can automatically return to the first usage condition again. Accordingly, without damaging usability, reliability can be obtained as well.

BEST MODES OF CARRYING OUT THE INVENTION

Figure 1A:
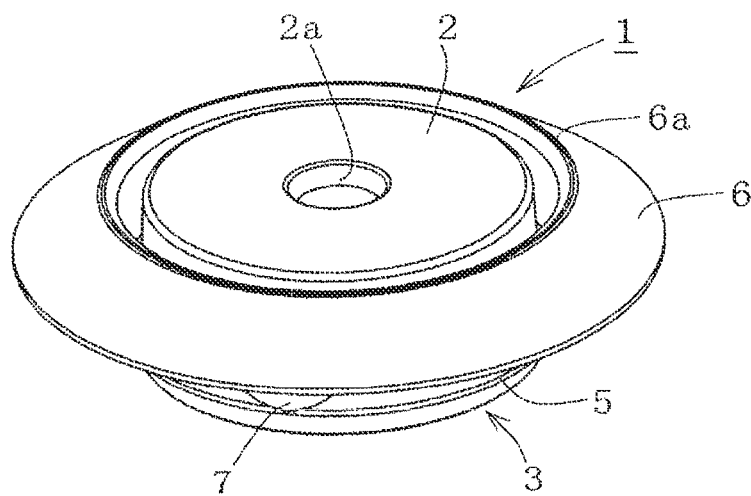
FIG. 1(a) is a schematic perspective view from an obliquely upward point of a hole plug according to an embodiment of the present invention.
Figure 1B:
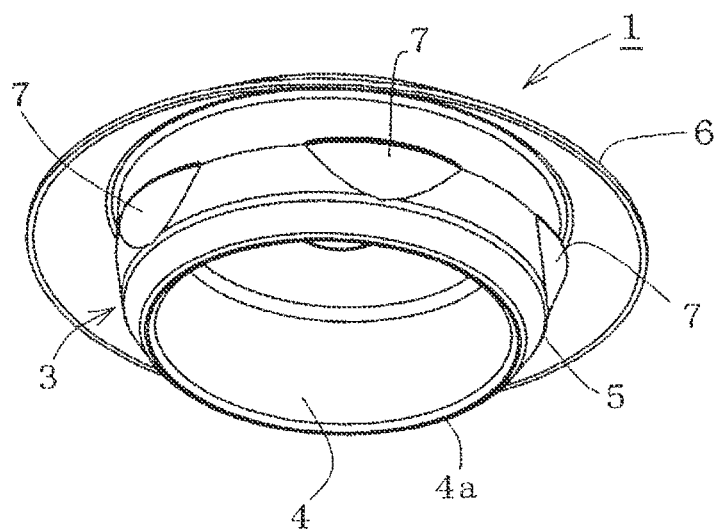
FIG. 1(b) is a schematic perspective view from an obliquely downward point of the hole plug according to the embodiment of the present invention.
Figure 2A:
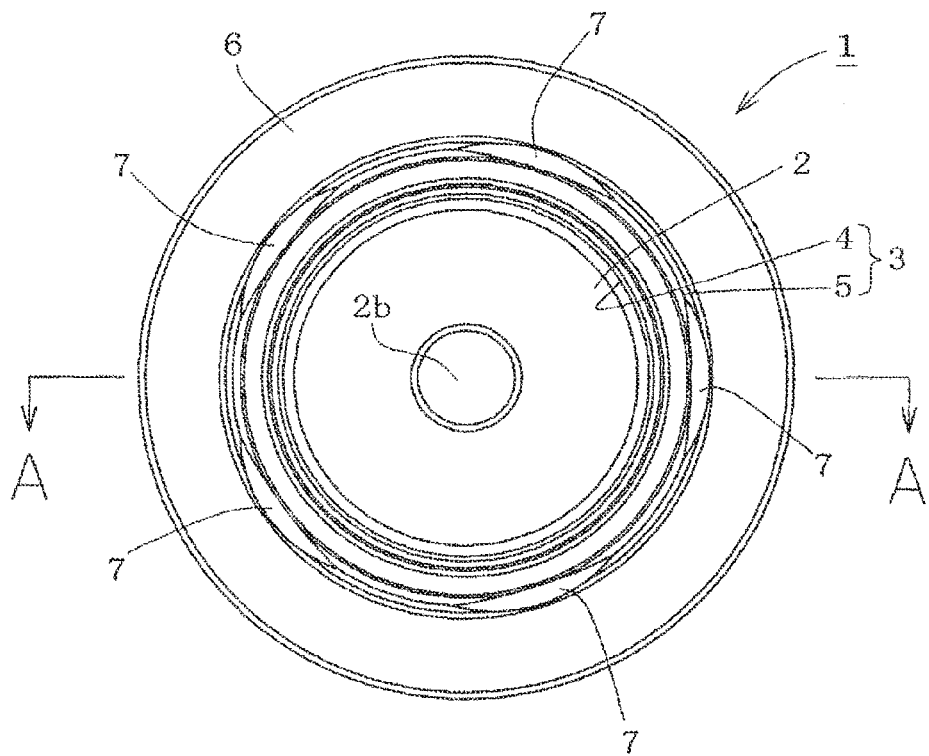
FIG. 2(a) is a bottom view of the hole plug according to the embodiment of the present invention.
Figure 2B:
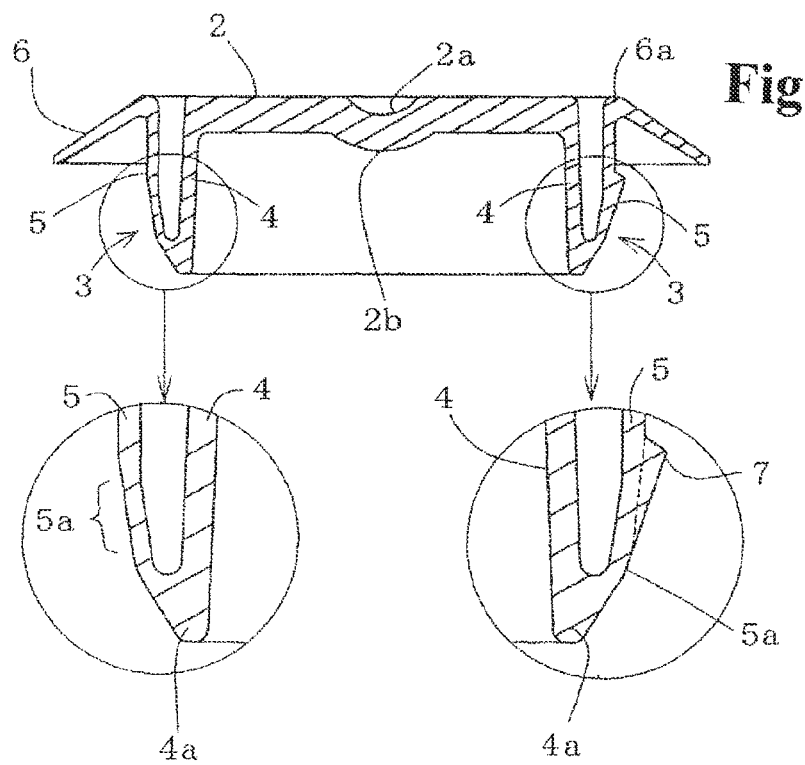
FIG. 2(b) is a cross-sectional view taken along a line A-A in FIG. 2(a).

With reference to drawings, a hole plug according to an embodiment of the present invention will be explained. In the following explanation, a structure of the hole plug and a usage example will be described in detail in that order. Incidentally, the hole plug of the present invention is not limited to a dimension (a size) shown in each figure, and can include various dimensions corresponding to a dimension of a hole provided in a plate material which is an attachment object.

(Structure)

As shown in FIGS. 1(a) to 5(b), a hole plug 1 integrally comprises a head portion 2 disposed in a central portion; a leg portion 3 provided to protrude downwardly from the head portion 2; and a flange portion 6 extending in a circumferential direction from an upper end portion of the leg portion 3. Also, the hole plug 1 is the same as the hole plug of the Patent Document 1 in that a hole 9a is blocked watertightly in a state wherein the leg portion 3 is inserted and locked relative to the hole 9a provided in a plate material 9 until a flange portion 6 hits against a plate material side and is controlled. An innovation is found in a leg portion structure. The hole plug 1 is an integral molded article manufactured by, for example, an injection molding of resin.

Incidentally, for a material of the hole plug 1, for example, comparatively soft resin such as polyethylene or polypropylene is preferably used. However, other resins which can obtain an appropriate amount of elasticity, further, rubber and the like may be used.

Figure 3A:
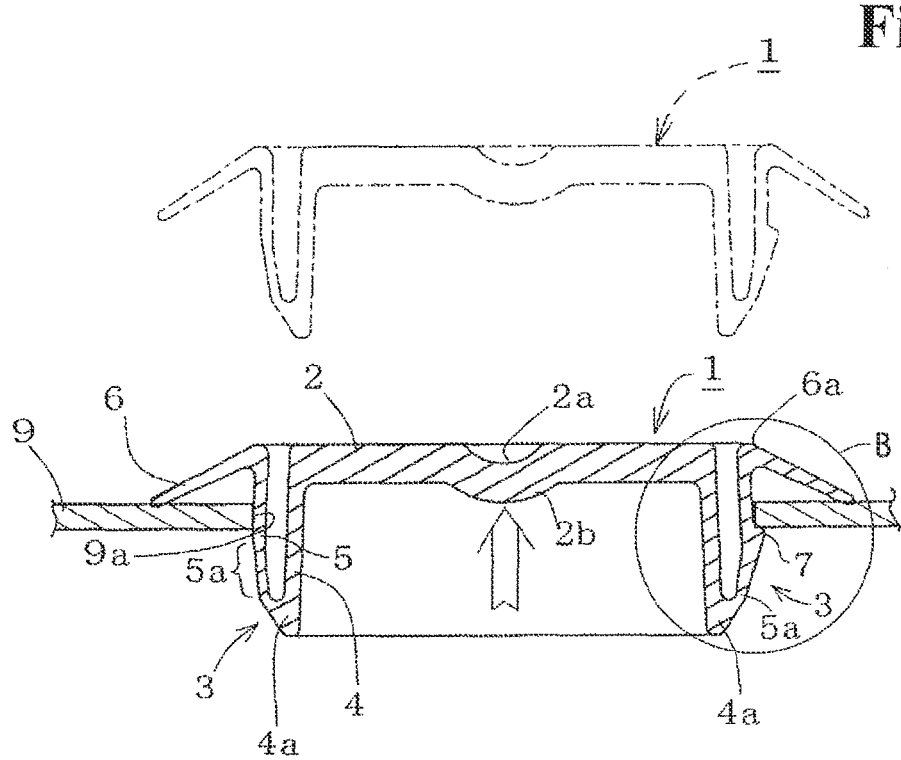
FIG. 3(a) is a cross-sectional view showing a first usage condition of the hole plug according to the embodiment of the present invention.
Figure 3B:
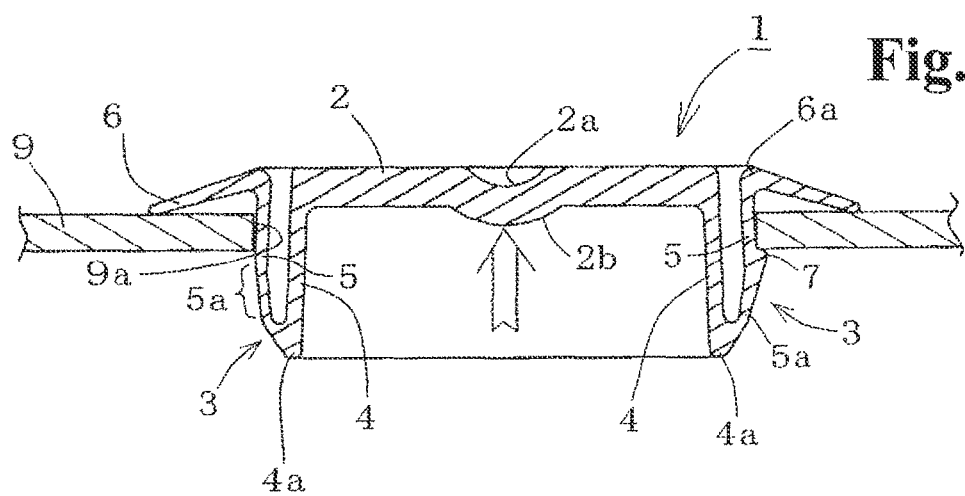
FIG. 3(b) is a cross-sectional view showing the first usage condition of the hole plug according to the embodiment of the present invention in a state wherein a thickness of a plate material is changed relative to FIG. 3(a).
Figure 4A:
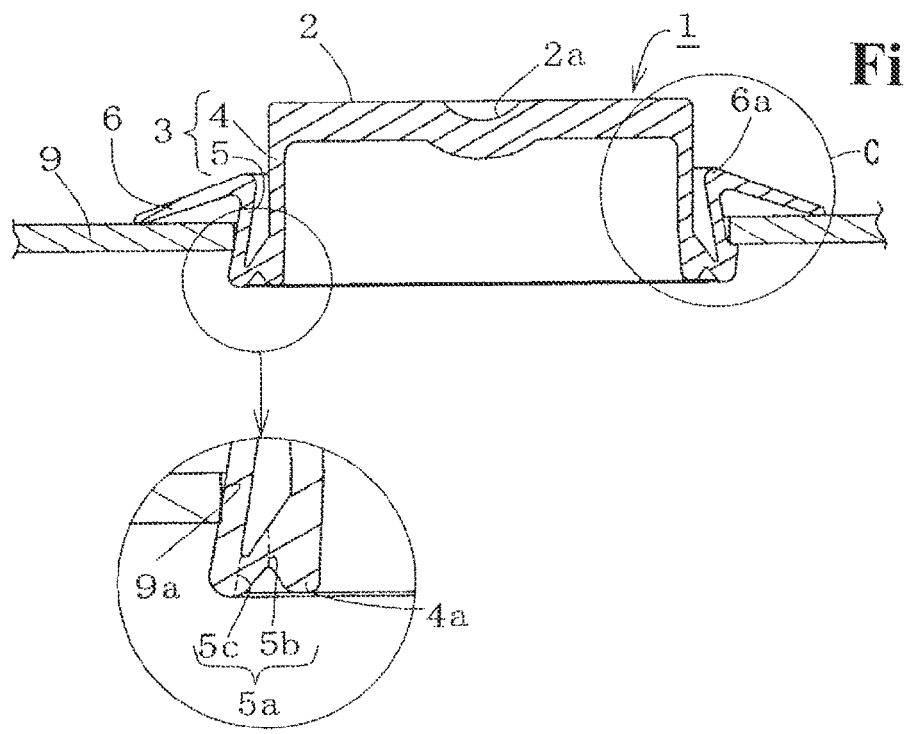
FIG. 4(a) is a cross-sectional view showing a state of being transitioned from the first usage condition shown in FIG. 3(a) to a second usage condition.
Figure 4B:
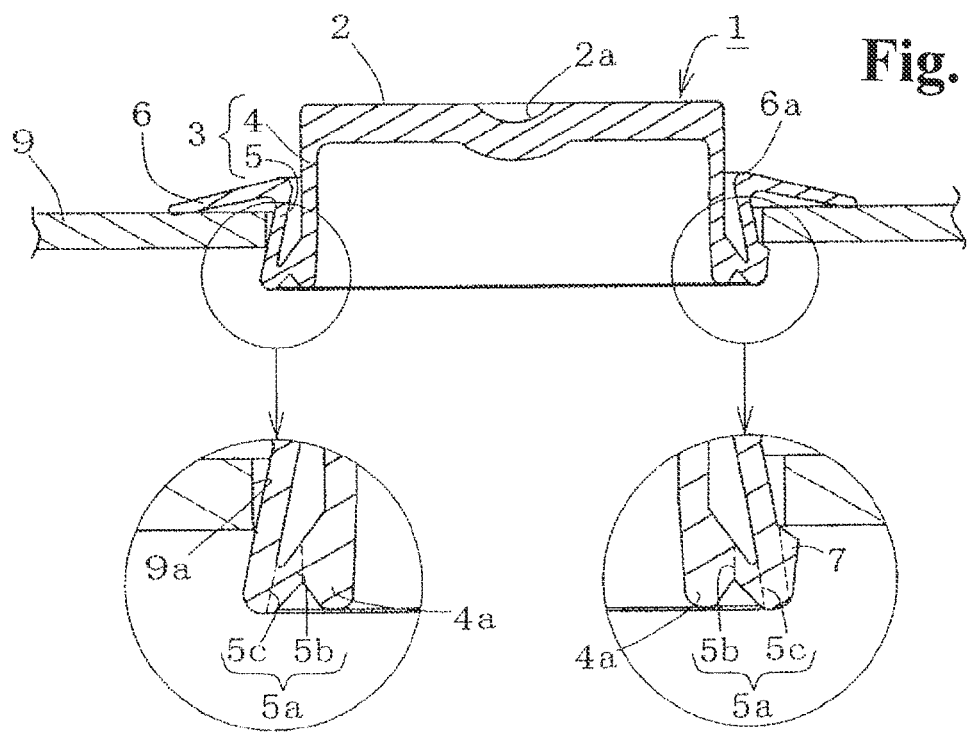
FIG. 4(b) is a cross-sectional view showing a state of being transitioned from the first usage condition shown in FIG. 3(b) to the second usage condition.

The leg portion 3 includes an inner wall 4 connected to the head portion 2, and an outer wall 5 extending approximately upward along the inner wall 4 from a folded portion 4a provided in an end portion of the inner wall 4. Also, between the inner wall 4 and the outer wall 5, there is provided a gap. Also, in one portion of the outer wall 5, there is provided a bendable thin-walled portion 5a. Then, in the leg portion 3, as shown in FIGS. 3(a) and 3(b), in a non-bending state wherein the thin-walled portion 5a of the outer wall 5 is not bent, the hole plug 1 can transition from a first usage condition locked in the hole 9a, to a second usage condition wherein an external force is applied to the head portion 2 and the like so that the thin-walled portion 5a of the outer wall 5 is elastically bent or folded so as to increase a pressed contacting force relative to the hole 9a as shown in FIGS. 4(a) and 4(b).

Specifically, the head portion 2 has a disk shape, and there are formed a concave portion 2a in a center portion on an upper side, and a convex portion 2b in a center portion on a lower side. On the other hand, the leg portion 3 roughly has a double cylindrical shape of the inner wall 4 and the outer wall 5. Among those, the inner wall 4 has an approximately cylindrical shape provided in a state wherein an upper end is integrated with a lower face of the head portion 2. The folded portion 4a is formed in the thickest of the inner wall 4, and is formed as a rigid-body portion having a thickness in an insertion direction more than the thin-walled portion 5a of the outer wall 5. This is a structure wherein the folded portion 4a is made as the rigid-body portion having the thickness in the insertion direction so as to be capable of preventing locking claws 7 from falling inward in the second usage condition and maintaining an abutting state of the locking claws 7 relative to the plate material 9, i.e., to be capable of receiving an external force applied to the locking claws 7 and preventing the locking claws from falling inward.

The outer wall 5 has an approximately cylindrical shape which is one size larger than the inner wall 4 provided in a state wherein a lower end is integrated with the folded portion 4a of the inner wall 4. Also, an end (a lower end in figures) side is slightly thinly narrowed down so as to be easily inserted into the hole 9a. In the outer wall 5, there are provided the plurality (five in this example) of locking claws 7, and the thin-walled portion 5a which becomes bendable. Each locking claw 7 is located on an outer face of the outer wall 5, and is provided as a convex shape in a portion equally dividing a circumference at a lower side only for a predetermined distance from an upper end of the outer face. As for the predetermined distance, in this example, a thickness of the plate material 9 is within a range of 0.5 mm to 2.0 mm to be applicable, so that the predetermined distance is a distance corresponding to the aforementioned thickness. Incidentally, the flange portion 6 is integrated with an upper end of the outer wall 5 through a connecting portion 6a so as to become an approximately umbrella shape, and a lower end of the umbrella shape is positioned on a slightly upper side more than the locking claws 7. Then, in the first usage condition shown in FIGS. 3(a) and 3(b), the connecting portion 6a and the head portion 2 are disposed nearly in the same height, i.e., an outer face of the head portion 2 and the connecting portion 6a are disposed nearly in the same plane.

Figure 5A:
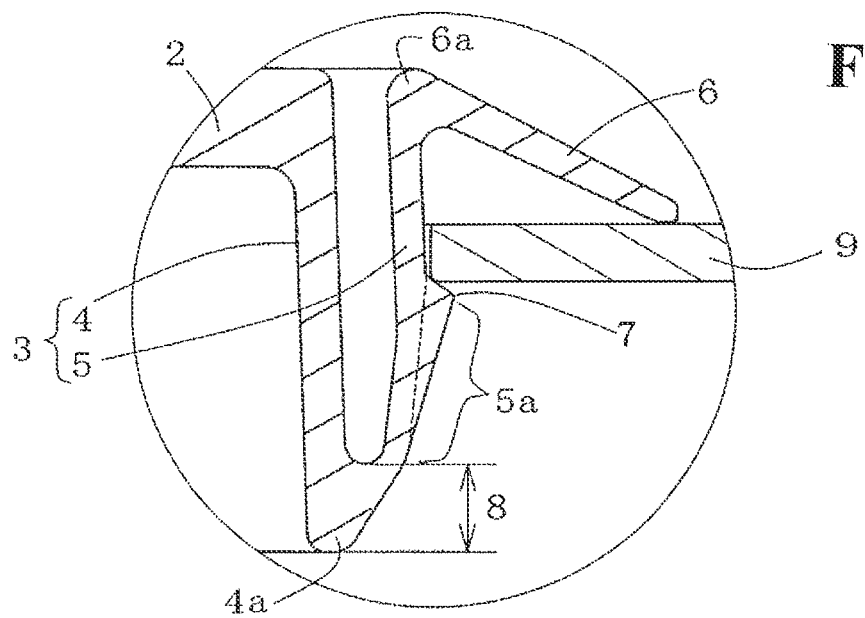
FIG. 5(a) is an enlarged view of a B portion in FIG. 3(a).
Figure 5B:
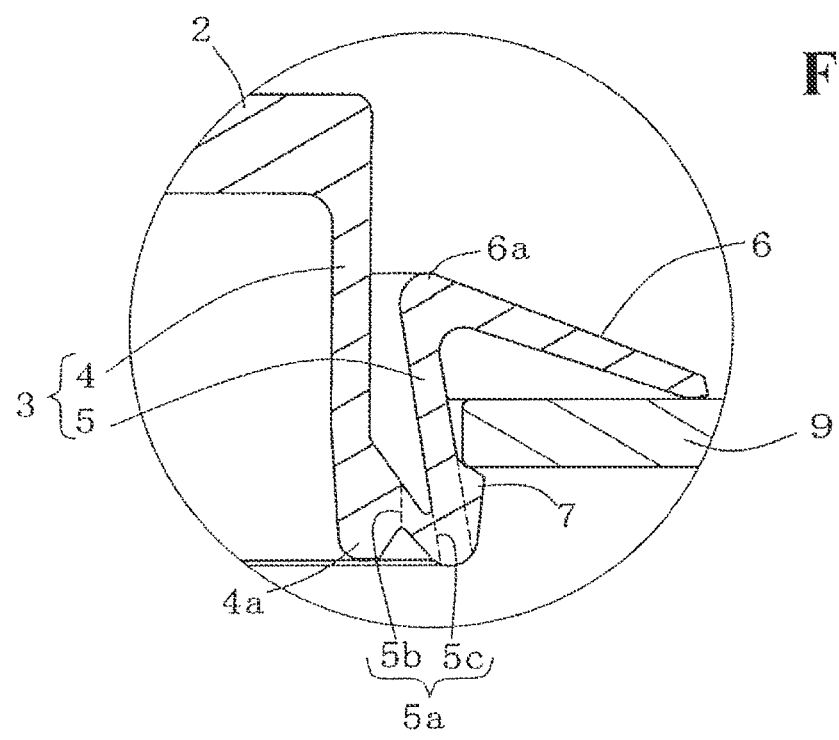
FIG. 5(b) is an enlarged view of a C portion in FIG. 4(a).

The thin-walled portion 5a is a portion formed in the thinnest of the outer wall 5, and is set thinner than a wall thickness of the inner wall 4. Also, in a state wherein the leg portion 3 is locked in the hole 9a through the locking claws 7, of the outer wall 5, the thin-walled portion 5a is provided between a portion (a lower side more than the predetermined distance) passing through the hole 9a and protruding outwardly, and the folded portion 4a of the inner wall 4. A length of the thin-walled portion 5a is formed longer than a total size 8 in the insertion direction of the folded portion 4a of the inner wall 4 in the first usage condition as shown in FIG. 5(a).

The above-mentioned requirements are important to form a first bend portion 5b wherein the outer wall 5 is bent or folded near a boundary with the folded portion 4a through the thin-walled portion 5a, and a second bend portion 5c wherein the outer wall 5 is bent or folded near just before the locking claw 7, in a state of being transitioned from the first usage condition shown in FIG. 3(a) and FIG. 3(b) to the second usage condition shown in FIG. 4(a) and FIG. 4(b) by the applied external force. Also, the above-mentioned requirements are important to form the folded portion 4a on an inner wall side as the rigid-body portion having the thickness in the insertion direction more than the thin-walled portion 5a of the outer wall 5 as evidenced by FIG. 5(a). Also, the above-mentioned requirements are important to elongate a distance between the first bend portion 5b and the second bend portion 5c more than a distance between an outer end face (a lower end face in the figures) of the folded portion 4a and the first bend portion 5b.

Usage Example

The above-mentioned hole plug 1 is the same as a conventional one in that the hole plug 1 is removably attached relative to the hole 9a of the plate material 9, and blocks the hole 9a. The hole plug 1 is different from the conventional one in that the hole plug 1 can transition from the first usage condition shown in FIG. 3(a) and FIG. 3(b) to the second usage condition shown in FIG. 4(a) and FIG. 4(b).

Namely, when the leg portion 3 is inserted relative to the hole 9a, and the head portion 2 is pressed with a finger or the like, the locking claw 7 elastically passes through the hole 9a, and engages with a peripheral edge of the hole 9a, so that the hole plug 1 is placed. In that process, the flange portion 6 is elastically deformed as a supporting point of the connecting portion 6a so as to reduce an inclined angle of the umbrella shape while the flange portion 6 is being pressed and contacting with an upper face of the plate material 9. Then, as the aforementioned inclined angle of the flange portion 6 diminishes, a force resistant to an insertion of the leg portion 3 is generated. By this force, the insertion of the leg portion 3 is controlled, and the flange portion 6 is pressed and contacts with the plate material 9, so that a water-tightness in and out of the hole 9a of the plate material 9 is maintained. In the hole plug 1 of the present embodiment, there can be obtained the water-tightness due to the fact that the flange portion 6 is pressed and contacts with the upper face of the plate material 9, and the water-tightness due to the fact that the leg portion 3 is pressed and contacts with an inner face of the hole 9a. Incidentally, as for the object plate material 9, for example, as shown in FIG. 3(a) and FIG. 3(b), the hole plug 1 can be used even if a thickness of a plate differs. Also, the larger a thickness size of the plate becomes, the flange portion 6 is elastically deformed in such a way that the inclined angle of the umbrella shape becomes smaller, and a pressed contacting force relative to the plate material 9 increases further so as to be capable of providing a high water-tightness.

Also, the hole plug 1 transitions from the first usage condition to the second usage condition by the external force applied in an arrow direction (above or in front of the head portion 2) from an inside of the leg portion 3 or the inner wall 4, for example, as shown in FIG. 3(a). In the second usage condition, the outer wall 5 composing the leg portion 3 forms the first bend portion 5b wherein the outer wall 5 is bent or folded near the boundary with the folded portion 4a through the thin-walled portion 5a; and the second bend portion 5c wherein the outer wall 5 is bent or folded near just before the locking claw 7, i.e., at the lower side of the convex shape composing the locking claw 7. Also, in the leg portion 3, the inner wall 4 is displaced in front, i.e., in a front direction separating from the plate material 9 relative to the first usage condition together with the head portion 2. At the same time, in the outer wall 5, an upper portion which is a connecting portion 6a side is displaced inward, and a lower portion is displaced outward. In the drawings, the outer wall 5 has an inverted V shape (a shape outspreading from the upper portion to the lower portion) as a whole.

As a result, in this structure, the lower side of the outer wall 5 is spread more than the upper side so as to provide a pressure contact relative to the hole 9a more strongly, and to increase a locking force or an extraction force relative to the hole 9a. Thereby, compared to a conventional product, a possibility of a disengagement from the hole 9a can be solved. Incidentally, even in the second usage condition, as for the object plate material 9, as evidenced by an example in FIG. 4(a) and FIG. 4(b), the hole plug 1 can be switched even if the thickness of the plate differs. Also, the larger the thickness size of the plate becomes, the flange portion 6 is elastically deformed in such a way that the inclined angle of the umbrella shape becomes smaller. Then, in the aforementioned structure, for example, even if a worker presses the head portion 2 and the like from an inside or a back side by mistake so as to transition to the second usage condition, when the external force thereof is released, the leg portion 3 returns to the first usage condition again from the second usage condition so as to be capable of maintaining usability without requiring a restoring operation.

Incidentally, the hole plug 1 explained above does not limit characteristics of the present invention described in the scope of patent claims at all, and details can be variously modified.

Also, in the aforementioned explanation, the "plate material" includes, for example, a panel for an automobile, a wall member dividing a housing or a casing of an aquarium or a device, and the like. Also, the structure "wherein the flange portion 6 abuts against the plate material 9 so as to be controlled" is not limited to the structure wherein the flange portion 6 directly abuts against a face of the plate material 9 located on a side in which the leg portion 3 is inserted, as in the case of the present embodiment. The structure also includes, for example, a structure wherein the flange portion 6 abuts against a member such as a packing and the like disposed on a top of the aforementioned face of the plate material 9. The "external force" includes a pressing force (this includes the external force when a worker has pressed the head portion 2 from the inside of the inner wall 4 which is the back side by mistake) at a time of operating to press in front of the head portion 2 from the inside of the inner wall 4; and a pressing force when another member hits against or bumps into the inner wall 4 or the folded portion 4a.

The present application is based on Japanese Patent Applications No. 2010-197419 filed on Sep. 3, 2010 and No. 2011-158907 filed on Jul. 20, 2011, and all contents thereof are incorporated herein as references.

EXPLANATION OF SYMBOLS

1 . . . a hole plug
2 . . . a head portion
2a . . . a concave portion
2b . . . a convex portion
3 . . . a leg portion
4 . . . an inner wall
4a . . . a folded portion
5 . . . an outer wall
5a . . . a thin-walled portion
5b . . . a first bend portion
5c . . . a second bend portion
6 . . . a flange portion
6a . . . a connecting portion
7 . . . locking claws
8 . . . a total size of the folded portion
9 . . . a panel (a plate material)
9a . . . a hole

What is claimed is:

1. A hole plug for plugging a hole of a plate material, comprising:
 a head portion;
 a leg portion including a cylindrical inner wall downwardly protruding from the head portion, and having a folded portion provided at a lower end thereof and formed as a rigid-body portion; and an outer wall extending upwardly from the folded portion along the inner wall to form a gap between the inner wall and the outer wall, and having locking claws arranged on the outer wall to be spaced apart from each other, an outer wall upper portion, and a bendable thin-walled portion arranged between the outer wall upper portion and the folded portion, between the locking claws; and
 a flange portion protruding outwardly from an upper end portion of the outer wall of the leg portion, wherein the thin-walled portion is thinner than the inner wall and the outer wall upper portion, and is longer than the folded portion relative to an insertion direction of the hole plug, and after the leg portion is inserted, for locking, to the hole of the plate material, when the folded portion is pushed upwardly, the thin-walled portion is bent elastically to change from a first usage condition in which the outer wall is locked in the hole with the locking claws in a non-bending state, to a second usage condition in which the locking claws are pushed outwardly to thereby firmly contact the locking claws with an edge of the hole.

2. The hole plug according to claim 1, wherein in the second usage condition, the outer wall forms a first bend portion wherein a vicinity of the folded portion in the thin-walled portion is bent, and a second bend portion wherein a vicinity of the locking claw in the thin-walled portion is bent.

3. The hole plug according to claim 2, wherein the rigid-body portion has a thickness in au insertion direction thicker than the thin-walled portion of the outer wall to prevent the locking claw from falling inward in the second usage condition, and to maintain an abutting state of the locking claw relative to the plate material.

4. The hole plug according to claim 1, wherein the inner wall in the second usage condition is displaced from the plate material relative to a position in the first usage condition together with the head portion, and the outer wall upper portion in the second usage condition is displaced inward relative to the position in the first usage condition, and the locking claws are displaced outward.

5. The hole plug according to claim 1, wherein the head portion in the first usage condition is located at a same height as a connecting portion between the flange portion and the outer wall.

6. The hole plug according to claim 1, wherein the outer will is configured to automatically return to the first usage condition after transitioning to the second usage condition.

7. The hole plug according to claim 1, wherein the thin-walled portion has a first bend portion and a second bend portion, in the second usage condition;

the first bend portion is a portion where the thin-walled portion is bent at a boundary with the folded portion, and the second bend portion is a portion where the thin-walled portion is bent at a vicinity of the locking claw; and a distance between the first bend portion and the second bend portion is longer than a distance between an outer end face portion of the folded portion and the first bend portion, in the second usage condition.

8. The hole plug according to claim 7, wherein the head portion in the second usage condition is located at a position higher than the head portion in the first usage condition.

* * * * *